United States Patent
Tanaka et al.

[11] Patent Number: 6,147,721
[45] Date of Patent: Nov. 14, 2000

[54] ULTRAVIOLET FILTER FOR PLASMA ADDRESSED LIQUID CRYSTAL DISPLAY

[75] Inventors: Masanobu Tanaka, Kanagawa; Masato Imai, Gifu; Tomoya Yano, Kanagawa; Kiyoshige Matsuura, Tokyo, all of Japan

[73] Assignee: Sony Corporation, Tokyo, Japan

[21] Appl. No.: 09/032,041

[22] Filed: Feb. 27, 1998

[30] Foreign Application Priority Data

Feb. 28, 1997 [JP] Japan ................... P9-061968

[51] Int. Cl.⁷ .................................................. G02F 1/133
[52] U.S. Cl. .......................................................... 349/32
[58] Field of Search ............................ 349/104, 105, 349/32

[56] References Cited

FOREIGN PATENT DOCUMENTS

| | | | |
|---|---|---|---|
| 52-46830 | 4/1977 | Japan | 349/104 |
| 56-116012 | 9/1981 | Japan | 349/104 |
| 51-81624 | 5/1984 | Japan | 349/104 |
| 64-28617 | 1/1989 | Japan | 349/104 |

*Primary Examiner*—James A. Dudek
*Attorney, Agent, or Firm*—Hill & Simpson

[57] ABSTRACT

Disclosed is a plasma addressed liquid crystal display improved to prevent deterioration of liquid crystal and an alignment film due to ultraviolet rays generated by plasma discharge. The plasma addressed liquid crystal display includes a liquid crystal cell including columns of signal electrodes, a plasma cell including rows of discharge channels, and an intermediate thin glass sheet through which the liquid crystal cell is joined to the plasma cell. The thin glass sheet includes an ultraviolet ray transmission preventive layer having a function of absorbing or reflecting ultraviolet rays generated in the discharge channels on the plasma cell side thereby preventing the ultraviolet rays from being made incident on the liquid crystal cell side.

5 Claims, 8 Drawing Sheets

ULTRAVIOLET FILTER FOR PLASMA ADDRESSED LIQUID CRYSTAL DISPLAY

BACKGROUND OF THE INVENTION

The present invention relates to a plasma addressed liquid crystal display having a flat panel structure in which a liquid crystal cell is laminated on a plasma cell through an intermediate thin glass sheet, and particularly to a technique for preventing deterioration of the liquid crystal cell due to ultraviolet rays generated on the plasma cell side.

A plasma addressed liquid crystal display has been disclosed, for example, in Japanese Patent Laid-open No. Hei 4-265931. FIG. 2 shows a structure of the plasma addressed liquid crystal display. As shown in this figure, the plasma addressed liquid crystal display has a flat panel structure including a liquid crystal cell 1, a plasma cell 2, and a common thin glass sheet 3 interposed therebetween. The thin glass sheet 3 is as extremely thin as about 50 μm in thickness, and is called "a microsheet". The plasma cell 2 has a lower glass substrate 4 joined to the thin glass sheet 3, and an ionizable gas is sealed in a gap therebetween. Stripe-like discharge electrodes are formed on an inner surface of the lower glass substrate 4. These discharge electrodes are composed of anodes A and cathodes K that are alternately arranged with one another. The discharge electrodes can be finely printed and baked on the flat glass substrate 4 at a high productivity and a high workability by screen printing or the like. Partitioning walls 7 are formed on the anodes A of these discharge electrodes for partitioning the gap filled with the ionizable gas into discharge channels 5. The partitioning walls 7 can be also formed and baked by screen printing in such a manner that top portions of the partitioning walls 7 are in contact with one surface side of the thin glass sheet 3. In this way, the discharge channels 5 are surrounded by a horizontal plane of the glass substrate 4, a horizontal plane of the thin glass sheet 3, and vertical side planes of the partitioning walls 7. As described above, the stripe-like discharge electrodes function as alternately arranged anodes A cathodes K, and generate plasma discharge therebetween. The plasma discharge involves generation of ultraviolet rays. In addition, the thin glass sheet 3 is joined to the lower glass substrate 4 by glass frit or the like.

The liquid crystal cell 1 has a transparent upper glass substrate 8. The glass substrate 8 is adhesively bonded on the other surface side of the thin glass sheet 3 using a sealing material or the like with a specific gap formed therebetween. The sealed gap is filled with liquid crystal 9. The liquid crystal 9 is composed of nematic liquid crystal, for example, 90° twist-oriented liquid crystal material. Signal electrodes 10 are formed on an inner surface of the upper glass substrate 8. The signal electrodes 10 are perpendicular to the stripe-like discharge channels 5, and matrix-like pixels are formed at crossing points between the signal electrodes 10 and the discharge channels 5. The flat panel structure having the above configuration is of a transmission type, in which the plasma cell 2 is positioned on the light incident side and the liquid crystal cell 1 is positioned on the light outgoing side. A polarizer 11 is mounted on an outer surface of the plasma cell 2 for converting illuminating light emitted from a backlight 12 into linearly polarized incident light. An analyzer 13 is mounted on an outer surface of the liquid crystal cell 1 for analyzing linearly polarized outgoing light having which has passed through the liquid crystal cell 1.

In the plasma addressed liquid crystal display having the above configuration, display is performed by switching the discharge signal to scan the rows of discharge channels 5 having the function of performing plasma discharge in a line-sequential manner and applying an image signal to the columns of signal electrodes 10 on the liquid crystal cell 1 side in synchronization with the scanning. When plasma discharge is generated in one discharge channel, the interior of the discharge channel comes to be at a nearly constant anode potential, thus performing pixel selection for one row. In other words, the discharge channel 5 functions as a sampling switch. When an image signal is applied to each signal electrode corresponding to the selected pixel in a state in which the plasma sampling switch is made conductive, a relevant pixel is sampled. Thus, lighting-on or lighting-off of the pixel is controlled. After the plasma sampling switch comes to be in a non-conductive state, the signal voltage remains in the pixel. To be more specific, the liquid crystal cell 1 converts polarized incident light into polarized outgoing light on the basis of a signal voltage, to perform image display. For this purpose, the liquid crystal 9 is composed of nematic liquid crystal, for example, twist-oriented. To orient the liquid crystal 9, an alignment film 14 is formed on the inner surface of the upper glass substrate 8, and an alignment film 15 is formed on the surface of the thin glass sheet 3 which surface is in contact with the liquid crystal 9.

In the plasma addressed liquid crystal display, the liquid crystal cell 1 is addressed by scanning the discharge channels 5 on the plasma cell 2 side. Upon scanning of the discharge channels 5, plasma discharge is generated. At this time, the plasma discharge involves generation of ultraviolet rays. In the related art plasma addressed liquid crystal display, ultraviolet rays Bring generated by plasma discharge have been made directly incident in the liquid crystal cell 1 through the intermediate thin glass sheet 3. The liquid crystal cell 1 contains organic materials constituting the liquid crystal 9, the alignment films 14 and 15, and the like. In general, ultraviolet rays cause deterioration of the organic materials constituting the liquid crystal 9 and the alignment films 14 and 15. This reduces a voltage retention ratio of the liquid crystal 9 and/or changes a pre-tilt angle of the twist-oriented liquid crystal 9. As a result, there occur problems of an after-image phenomenon due to unevenness in voltage retention ratio within a screen and of a variation in voltage/transmittance characteristic of the liquid crystal.

SUMMARY OF THE INVENTION

An object of the present invention is to provide a plasma addressed liquid crystal display that is improved to prevent deterioration of the liquid crystal and an alignment film due to ultraviolet rays generated by the plasma discharge.

To achieve the above object, according to a first aspect of the present invention, there is provided a plasma addressed liquid crystal display including: a liquid crystal cell including columns of signal electrodes; a plasma cell including rows of discharge channels; and an intermediate thin glass sheet through which the liquid crystal cell is joined to the plasma cell; wherein the thin glass sheet includes an ultraviolet ray transmission preventive layer having a function of absorbing or reflecting ultraviolet rays generated in the discharge channels on the plasma cell side thereby preventing the ultraviolet rays from being made incident on the liquid crystal cell side. The ultraviolet ray transmission preventive layer preferably includes an ultraviolet ray transmission preventive film applied on at least one surface of the thin glass sheet. Further, the ultraviolet ray transmission preventive film preferably contains at least $TiO_2$ or $ZnO$.

According to a second aspect of the present invention, there is provided a method of manufacturing a plasma addressed liquid crystal display having the configuration described in the first aspect of the present invention, including the steps of: previously forming an ultraviolet ray transmission preventive film having a function of absorbing or reflecting ultraviolet rays on one surface of the thin glass sheet by printing, spin-coating, vapor-deposition or sputtering; joining the plasma cell on one surface side of the thin glass sheet; and joining the liquid crystal cell on the other surface side of the thin glass sheet. Alternatively, the above method may include the steps of: previously applying an ultraviolet ray transmission preventive film having a function of absorbing or reflecting ultraviolet rays on both surfaces of the thin glass sheet by dipping, and baking the ultraviolet ray transmission preventive film; joining the plasma cell on one surface side of the thin glass sheet; and joining the liquid crystal cell on the other surface side of the thin glass sheet.

According to the plasma addressed liquid crystal display of the present invention, an ultraviolet ray transmission preventive layer is provided on a thin glass sheet provided to separate a liquid crystal cell from a plasma cell. The ultraviolet ray transmission preventive film prevents ultraviolet rays generated by plasma discharge on the plasma cell side from being irradiated on a liquid crystal layer and an alignment film on the liquid crystal cell side. This makes it possible to prevent deterioration of the liquid crystal and the alignment film and hence to keep display characteristics of the liquid crystal cell stably for a long-period of time.

DETAILED DESCRIPTION OF THE PREFERRED EMBODIMENTS

Hereinafter, preferred embodiments of the present invention will be described in detail with reference to the drawings.

Figure 1:
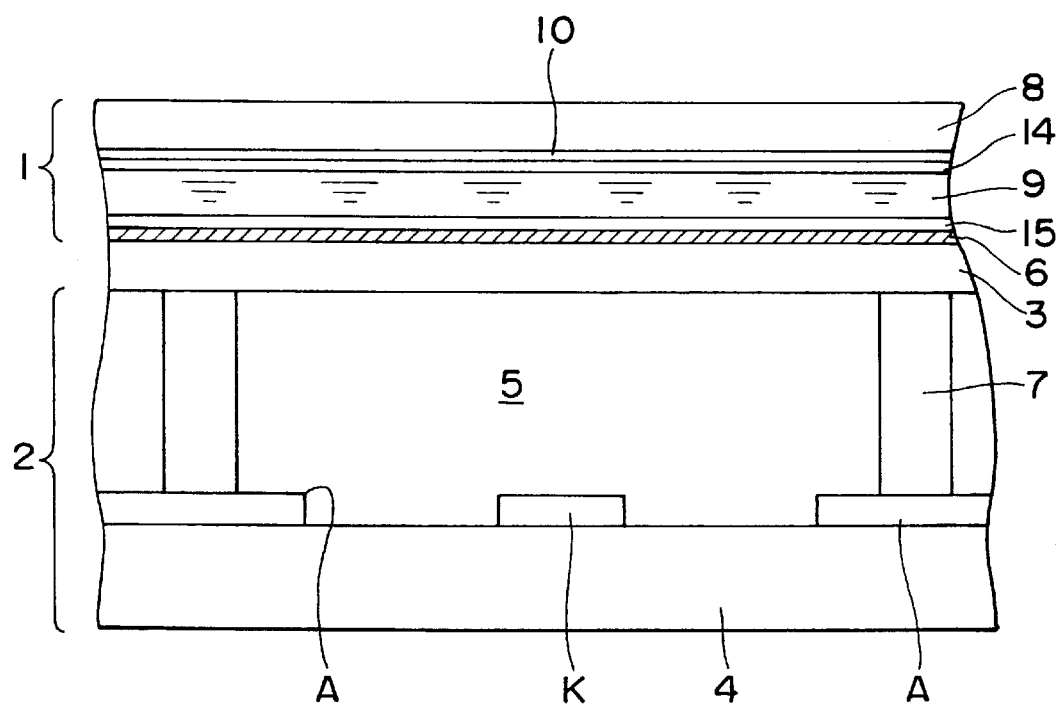
FIG. 1 is a typical partial sectional view of a first embodiment of a plasma addressed liquid crystal display of the present invention.
Figure 2:
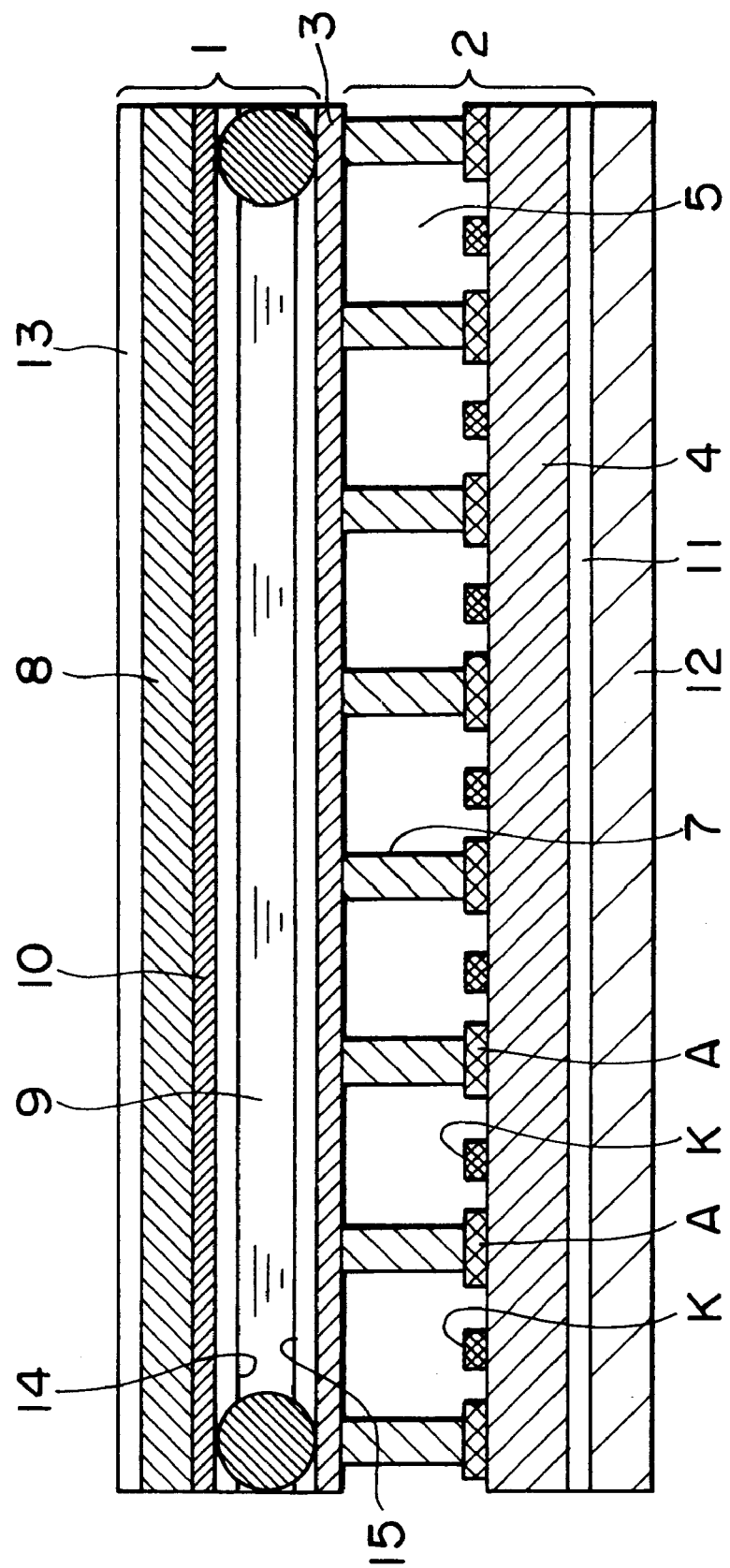
FIG. 2 is a partial sectional view showing one example of a related art plasma addressed liquid crystal display.

FIG. 1 is a typical partial sectional view showing a first embodiment of a plasma addressed liquid crystal display of the present invention. It should be noted that parts corresponding to those in the related art plasma addressed liquid crystal display shown in FIG. 2 are indicated by the same reference numerals for ease of understanding. As shown in FIG. 1, the plasma addressed liquid crystal display has a flat panel structure in which a liquid crystal cell 1 including columns of signal electrodes 10 is joined to a plasma cell 2 including rows of discharge channels 5 through an intermediate thin glass sheet 3. The intermediate thin glass sheet 3 is previously formed to be as extremely thin as about 50 $\mu$m in thickness. The liquid crystal cell 1 has an upper glass substrate 8 adhesively bonded to the thin glass sheet 3 with a specific gap formed put therebetween. The gap, after being sealed, is filled with nematic liquid crystal 9, for example, twist-oriented. To control alignment of the liquid crystal 9, an alignment film 14 is formed on an inner surface of the glass substrate 8, and an alignment film 15 is formed on an upper surface side of the thin glass sheet 3. Each of the alignment films 14 and 15 is made from an organic material such as a polyimide film. Besides, the plasma cell 2 has a lower glass substrate 4 jointed to the thin glass sheet 3 with a specific gap formed put therebetween. The gap is partitioned by stripe-like partitioning walls 7 to form the discharge channels 5. An ionizable gas is sealed in the discharge channels 5. An anode A and a cathode K are formed along each discharge channel 5. By applying a specific voltage between these discharge electrodes, a plasma discharge is generated in the discharge channels 5. The plasma discharge involves generation of ultraviolet rays.

As a feature of the present invention, the thin glass sheet 3 includes an ultraviolet ray transmission preventive layer having a function of absorbing or reflecting ultraviolet rays generated in the discharge channels 5 on the plasma cell 2 side thereby preventing the ultraviolet rays from being made incident on the liquid crystal cell 1 side. In this embodiment, the ultraviolet ray transmission preventive layer is composed of an ultraviolet ray transmission preventive film 6 applied on at least one surface of the thin glass sheet 3. The ultraviolet ray transmission preventive film 6 contains at least $TiO_2$ or $ZnO$. In addition to the ultraviolet ray transmission preventive film 6, the ultraviolet ray transmission preventive layer may be formed by dispersing an ultraviolet ray reflecting or absorbing material in the thin glass sheet 3. In this way, according to the present invention, the ultraviolet ray transmission preventive film 6 is formed on the intermediate thin glass sheet 3 disposed to separate the liquid crystal cell 1 from the plasma cell 2 for preventing ultraviolet rays generated by plasma discharge from being made incident in the liquid crystal 9 and the alignment films 14 and 15. Specifically, the ultraviolet ray transmission preventive film 6 is provided between the thin glass sheet 3 positioned directly over the discharge channels 5 and the alignment film 15. The ultraviolet ray transmission preventive film 6 has the function of absorbing or reflecting ultraviolet rays, and thereby it takes a role of reducing deterioration of the liquid crystal 9 and alignment films 14 and 15 due to ultraviolet rays.

Figure 3:
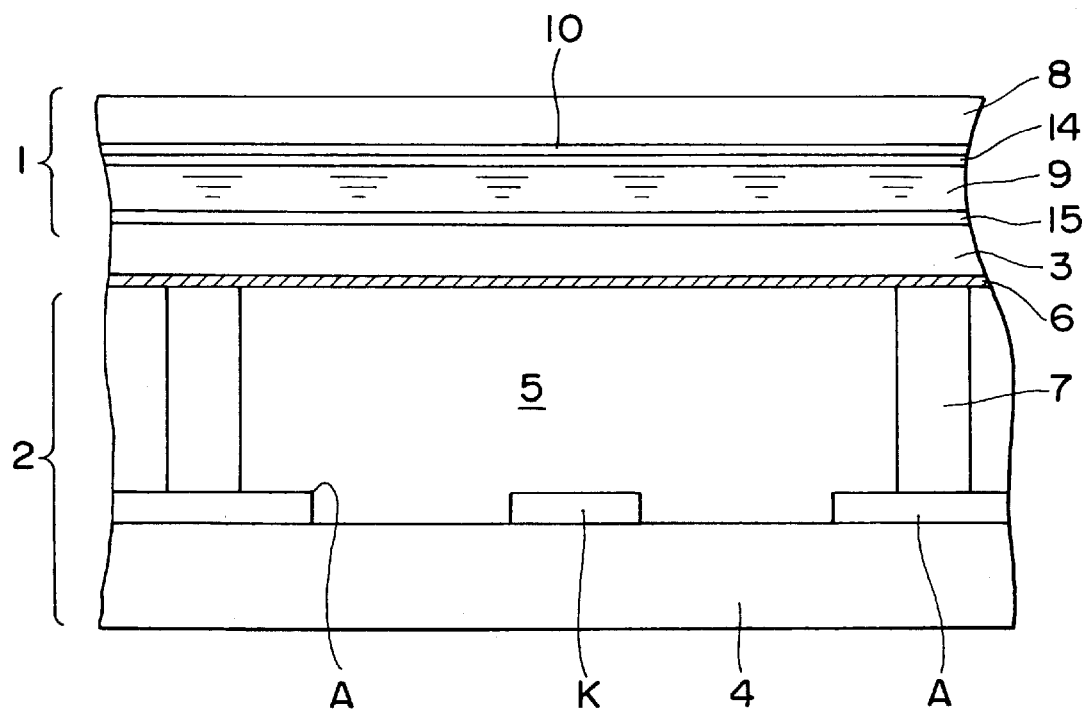
FIG. 3 is a partial sectional view showing a second embodiment of the plasma addressed liquid crystal display of the present invention.

FIG. 3 is a partial sectional view of a second embodiment of the plasma addressed liquid crystal display of the present invention. For an easy understanding, parts corresponding to those in the first embodiment shown in FIG. 1 are indicated by the same reference numerals. In this embodiment, an ultraviolet ray transmission preventive film 6 is formed not on an upper surface side of the thin glass sheet 3 but on a lower surface side thereof. The plasma addressed liquid crystal display having the above configuration is manufactured in accordance with the following steps. First, the ultraviolet ray transmission preventive film 6 having a function of absorbing or reflecting ultraviolet rays is previously formed on one surface of a single thin glass sheet by printing, spin-coating, vapor-deposition, or sputtering. For example, in the case of coating of the ultraviolet ray transmission preventive film 6 by printing or spin-coating, a liquid coating agent is applied on the surface of the thin glass sheet by printing or spin-coating, and baked by heating. The baking temperature for the coating agent occasionally reaches about 300° C. depending on the material of the coating agent. Since the ultraviolet ray transmission preventive film 6 is formed on the single thin glass sheet in this embodiment, it can be baked at such a specific temperature as to reach the above high temperature without any adverse thermal effect exerted on the subsequent steps. Next, a plasma cell 2 is joined to one surface side of the thin glass sheet 3. To be more specific, anodes A, cathodes K, and partitioning walls 7 are previously formed on a lower glass substrate 4 by screen printing or the like. The glass substrate 4 is then joined to a lower surface of the thin glass sheet 3 by glass frit or the like. Further, an ionizable gas is sealed in a gap positioned between the thin glass sheet 3 and the glass substrate 4 and partitioned by the partitioning walls 7, to thereby provide discharge channels 5. Then, the liquid crystal cell 1 is joined on the other surface side of the thin glass sheet 3. To be more specific, an alignment film 15 made from a polyimide film or the like is formed on an upper surface of the thin glass sheet 3. Signal electrodes 10 formed of a transparent conductive film made from ITO or the like are patterned in a stripe shape on one surface of an upper glass substrate 8. An alignment film 14 is also formed. The glass substrate 8 is adhesively bonded on the upper surface of the thin glass sheet 3 by a sealing material with a specific gap formed therebetween. Finally, the gap between the glass substrate 8 and the thin glass sheet 3 is sealed and filled with liquid crystal 9, to complete the plasma addressed liquid crystal display.

The method of forming the ultraviolet ray transmission preventive film 6 which is the component characterized by the present invention will be described in detail below. In this embodiment, the ultraviolet ray transmission preventive film 6 is formed, by spin-coating, using a coating agent (produced by Nissan Chemical Industries, Ltd.) containing $TiO_2$ having a reflecting function to ultraviolet rays. The coating agent is applied on the surface of the thin glass sheet 3 at a specific rotational speed by spin-coating, followed by irradiation of ultraviolet rays for about 5 min using a high voltage lamp (140 mW) to be thus temporarily cured. After that, the resultant film is baked by heating at a temperature of 300° C. for 30 min. As a result, the stable ultraviolet ray transmission preventive film 6 having a thickness of about 70nm is formed.

As another embodiment, the ultraviolet ray transmission preventive film 6 is formed, by spin-coating, using a coating agent produced by TONEN CORPORATION. The coating agent is formed by dispersing ultra-fine particles of ZnO in a solution in which polysilazane is dissolved in a solvent of xylene/toluene (nor-volatile content: 30 wt %). The solution is applied on the surface of the thin glass sheet 3 by spin-coating, and baked at 300° C. for 1 hr. The ultraviolet ray transmission preventive film 6 has a mixed composition of $SiO_2$ and ZnO. By spin-coating of the above solution at a rotational speed of 500 rpm for 20 sec, the ultraviolet ray transmission preventive film 6 having a thickness of 1,000 nm is obtained. The ultraviolet ray transmission preventive film 6 having a thickness of 800 nm is obtained by spin-coating of the solution at a rotational speed of 1,000 rpm for 20 sec. Further, the spin-coating of the solution at a rotational speed of 1,500 rpm for 20 sec forms the ultraviolet ray transmission preventive film 6 having a thickness of about 630 nm. The ultraviolet ray transmission preventive film 6 formed by such steps is effective to shield ultraviolet rays having wavelengths in a range of about 360 nm or less.

Figure 4:
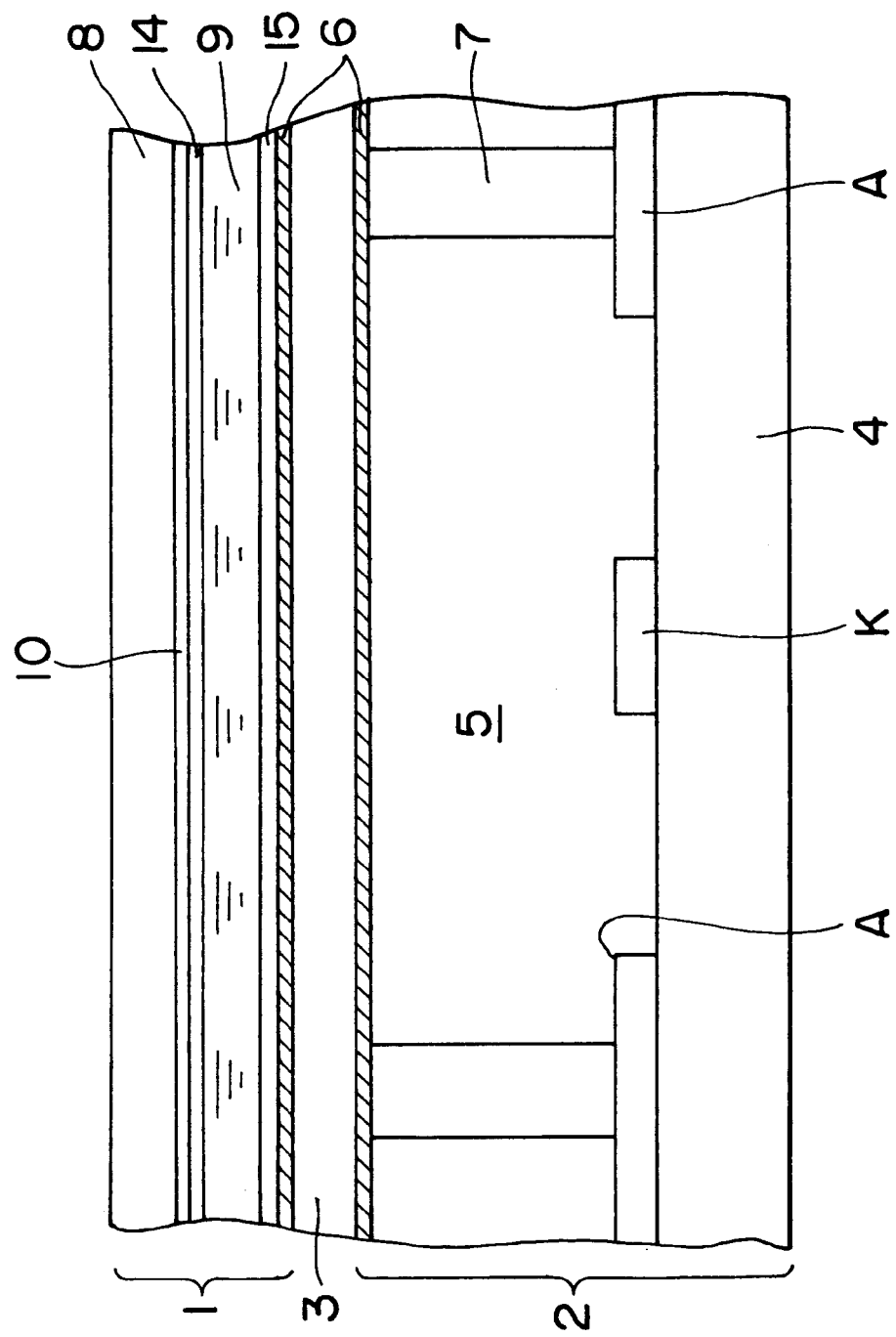
FIG. 4 is a typical partial sectional view showing a third embodiment of the plasma addressed liquid crystal display of the present invention.

FIG. 4 is a typical partial sectional view showing a third embodiment of the plasma addressed liquid crystal display of the present invention. For ease of understanding, parts corresponding to those in the first embodiment shown in FIG. 1 are indicated by the same reference numerals. In this embodiment, an ultraviolet ray transmission preventive film 6 is formed on both surfaces of a thin glass sheet 3. Here, the ultraviolet ray transmission preventive film 6 having a function of absorbing or reflecting ultraviolet rays is previously applied on both the surfaces of the thin glass sheet 3 in a single substance state by dipping, followed by baking of the film. The dipping process is performed by dipping the thin glass sheet 3 in a solution in which particles of $TiO_2$ or ZnO are dispersed, and drawing, drying and baking the thin glass sheet 3 coated with the coating agent, to form the ultraviolet ray transmission preventive film 6. The dipping process is advantageous in that the working steps are simplified as compared with the above-described process using spin-coating or the like.

Figure 5:
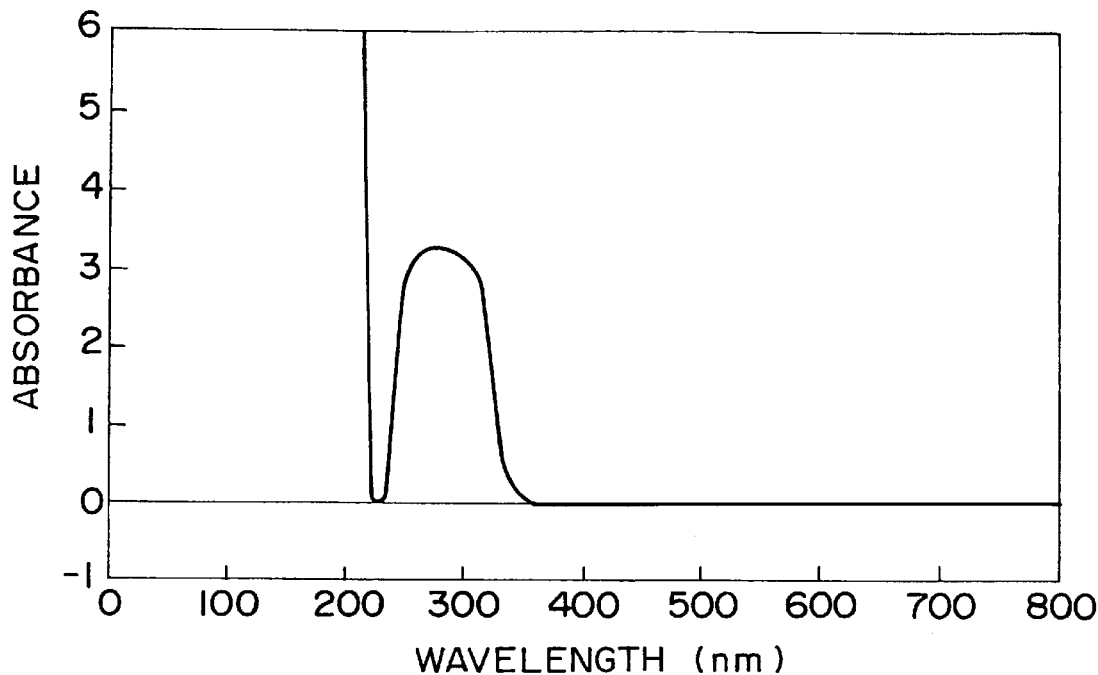
FIG. 5 is a graph showing an absorption spectrum of liquid crystal.

FIG. 5 is a graph showing one example of an absorption spectrum of the liquid crystal 9. In this graph, the abscissa indicates wavelength and the ordinate indicates absorbance. As will be apparent from the graph, the liquid crystal absorbs ultraviolet rays having wavelengths in a range of 400 nm or less. It is generally known that the liquid crystal composed of an organic material is deteriorated typically by decomposition of bonding of the liquid crystal due to irradiation of ultraviolet rays. The deterioration of the liquid crystal 9 due to absorption of ultraviolet rays causes a reduction in retention ratio of a signal voltage.

Figure 6:
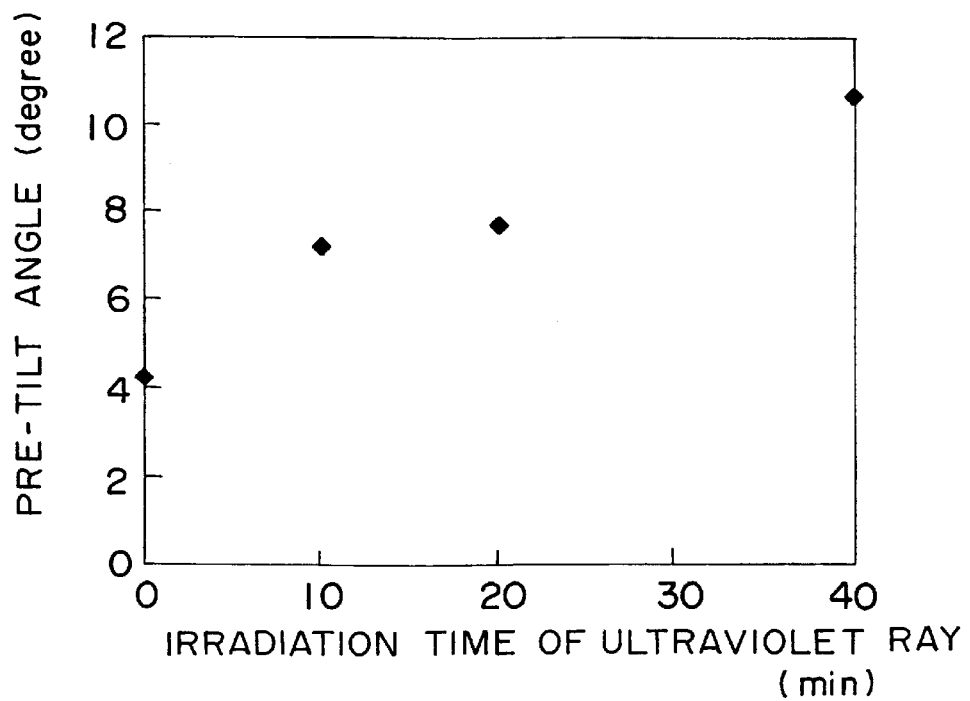
FIG. 6 is a graph showing a change in pre-tilt angle of liquid crystal due to irradiation of ultraviolet rays.

FIG. 6 is a graph showing a change in pre-tilt angle of the liquid crystal 9 due to irradiation ultraviolet rays. In this graph, the abscissa indicates an irradiation ultraviolet rays and the ordinate indicates a pre-tilt angle. The pre-tilt angle represents a tilt angle of molecules of liquid crystal at an interface between the alignment films 14 and 15. In a state before irradiation of ultraviolet rays, the pre-tile angle is about 4°. This means that molecules of liquid crystal are controlled to be oriented nearly along the horizontal direction. However, the alignment film 15 is deteriorated by irradiation of ultraviolet rays, so that the pre-tilt angle is shifted upward. The change in pre-tile angle with elapsed time varies the operational characteristics of the liquid crystal cell 1. To be more specific, there occurs a problem that a voltage/transmittance characteristic of the liquid crystal cell 1 is changed with an elapsed time.

Figure 7A:
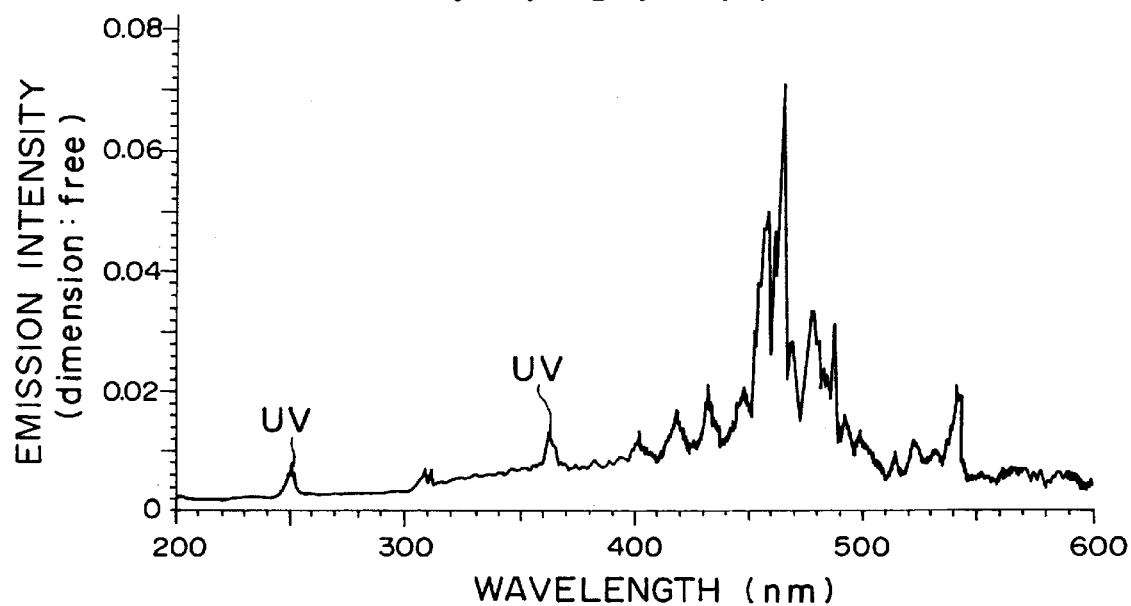
FIG. 7A and 7B are graphs each showing an emission spectrum of plasma discharge generated in discharge channels.
Figure 7B:
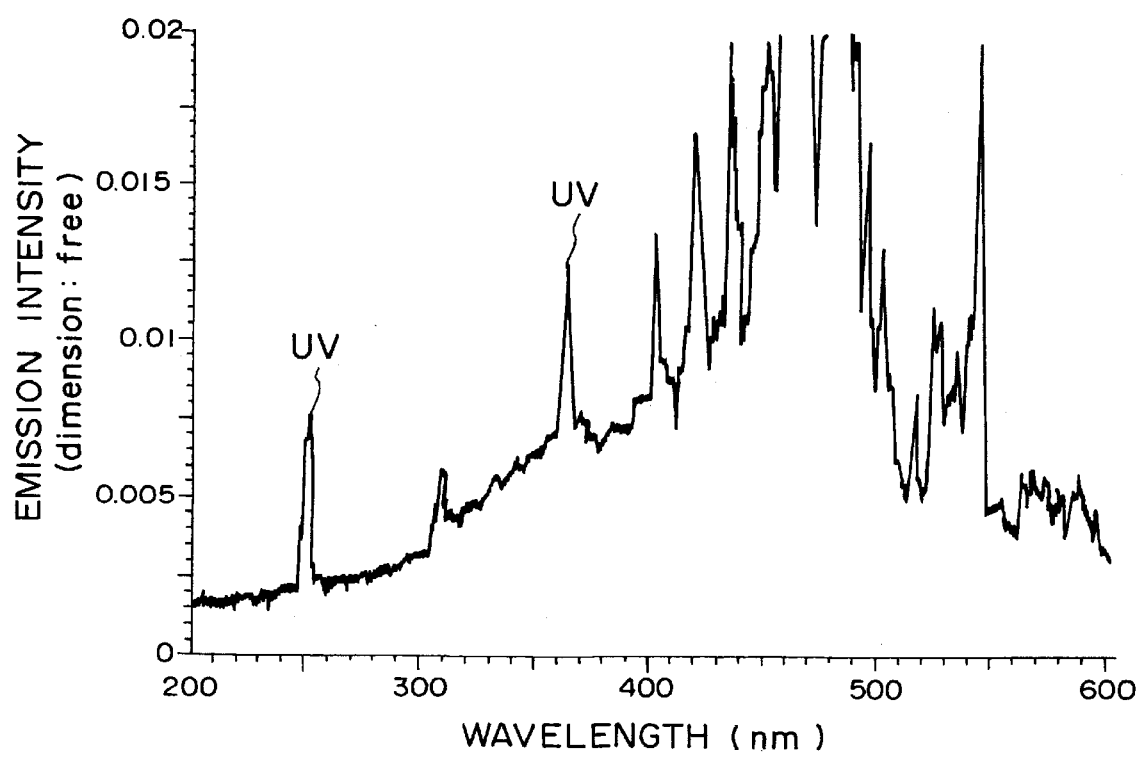

FIGS. 7A and 7B are graphs each showing an emission spectrum of plasma discharge generated in the discharge channels 5. In these graphs, the abscissa indicates a wavelength and the ordinate indicates an emission intensity. In the graph of FIG. 7B, the dimension in FIG. 7A is enlarged along the ordinate. The emission spectrum is measured on the thin glass sheet 3. As will be apparent from the graphs, two emission peaks (UV) of ultraviolet rays are recognized in a wavelength range of 380 nm or less: one appearing at a wavelength of 254 nm and the other appearing at a wavelength near 365 nm. Each of the peaks is the emission spectrum of ultraviolet rays due to a trace of mercury contained in the discharge channels 5. In the plasma addressed liquid crystal display, the thin glass sheet 3 disposed to separate the plasma cell 2 from the liquid crystal cell 1 is as extremely thin as about 50 $\mu$m, and accordingly, it cannot shield ultraviolet rays generated by the discharge channels 5.

Figure 8B:
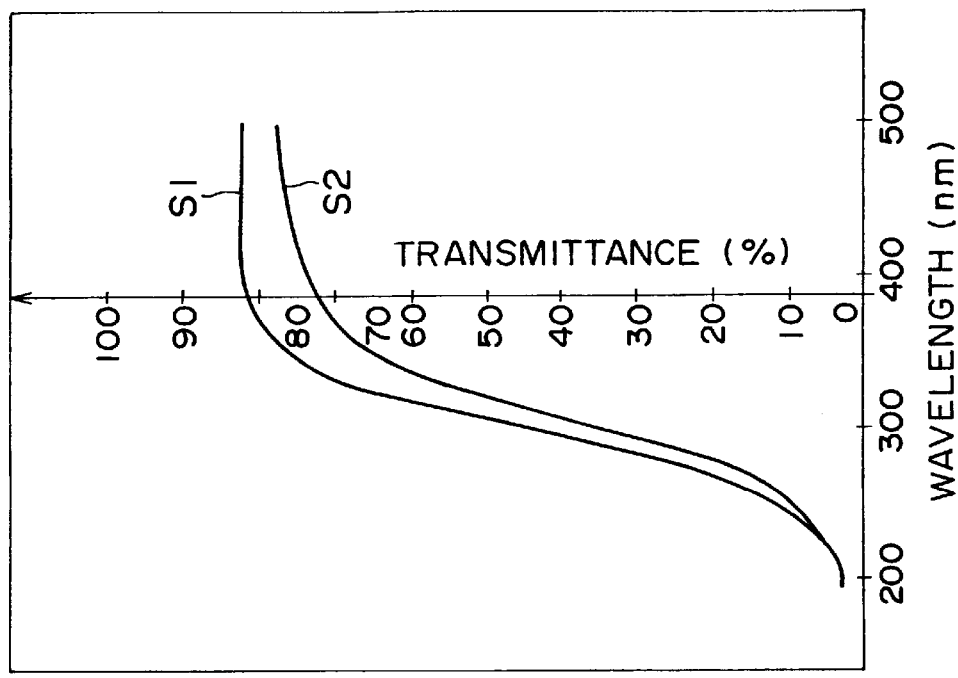
FIGS. 8A and 8B are graphs each showing a transmittance characteristic of a thin glass sheet and the thin glass sheet on which the ultraviolet ray transmission preventive film is formed.
Figure 8A:
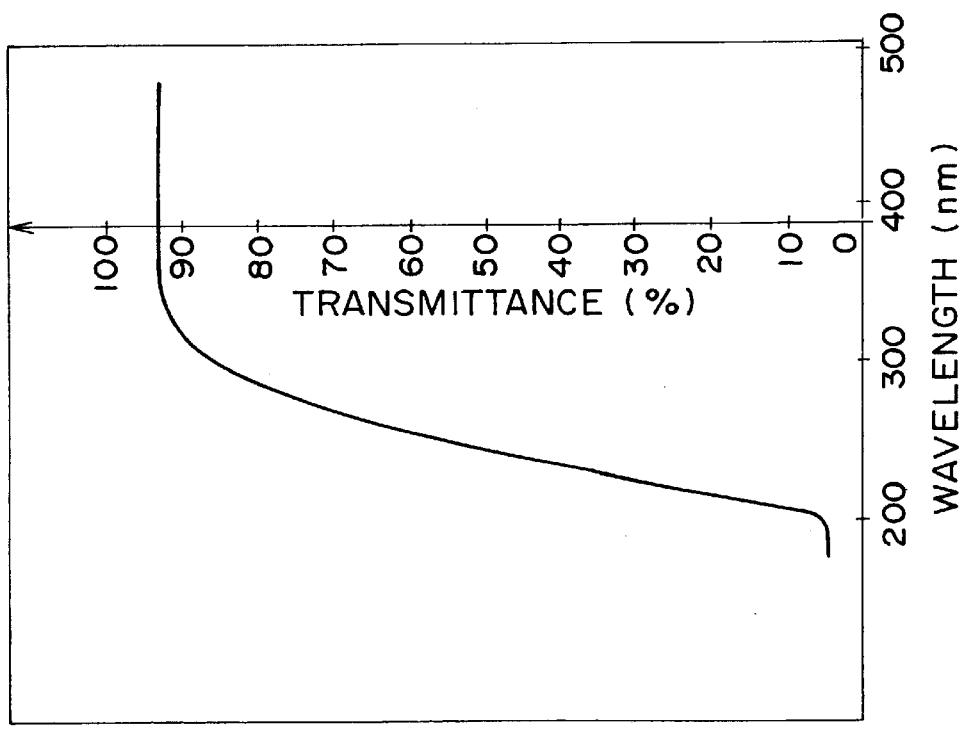

FIG. 8A is a graph showing a transmittance characteristic of the thin glass sheet 3. In this graph, the abscissa indicates wavelength and the ordinate indicates transmittance. As will be apparent from this graph, the thin glass sheet 3 cannot perfectly shield ultraviolet rays having wavelengths in a range of 380 nm or less. For example, the thin glass sheet 3 allows about 60% of ultraviolet rays having a wavelength of 254 nm to pass therethrough.

FIG. 8B is a graph showing a transmittance characteristic of the thin glass sheet 3 on which the ultraviolet ray transmission preventive film 6 is formed. In this graph, the abscissa indicates wavelength and the ordinate indicates a transmittance. The graph shows a transmittance characteristic of the thin glass sheet 3 on which the alignment film 15 is formed in addition to the ultraviolet ray transmission preventive film 6. As the thin glass sheet 3, there is used a no-alkali glass sheet having a thickness of 50 $\mu$m. The ultraviolet ray transmission preventive film 6 is made from a coating agent containing $TiO_2$ and has a thickness of about 90 nm. As the alignment film 15, there are used two kinds of alignment films S1 and S2 each having a thickness of about 30 nm. The alignment films S1 and S2 are different from each other in transmittance characteristic. The alignment film S2 is lower in transmittance characteristic than the alignment film S1, and therefore, it is superior to the alignment film S1 in shielding performance of ultraviolet rays. As will be apparent from the graph, the use of the alignment film S1 reduces the transmittance of the ultraviolet rays (wavelength: 254 nm) to 14%; and the use of the alignment film S2 reduces the transmittance of the ultraviolet rays (wavelength: 254 nm) to 11%. In this way, selection of a material of the alignment film is somewhat effective to reduce the transmission of ultraviolet rays. In each case, formation of the ultraviolet ray transmission preventive film 6 on the thin glass sheet 3 allows the transmittance of ultraviolet rays to be significantly reduced. As the material of the ultraviolet ray transmission preventive film 6, there can be used $TiO_2$ (titanium oxide) or ZnO (zinc oxide) described above.

Figure 9A:
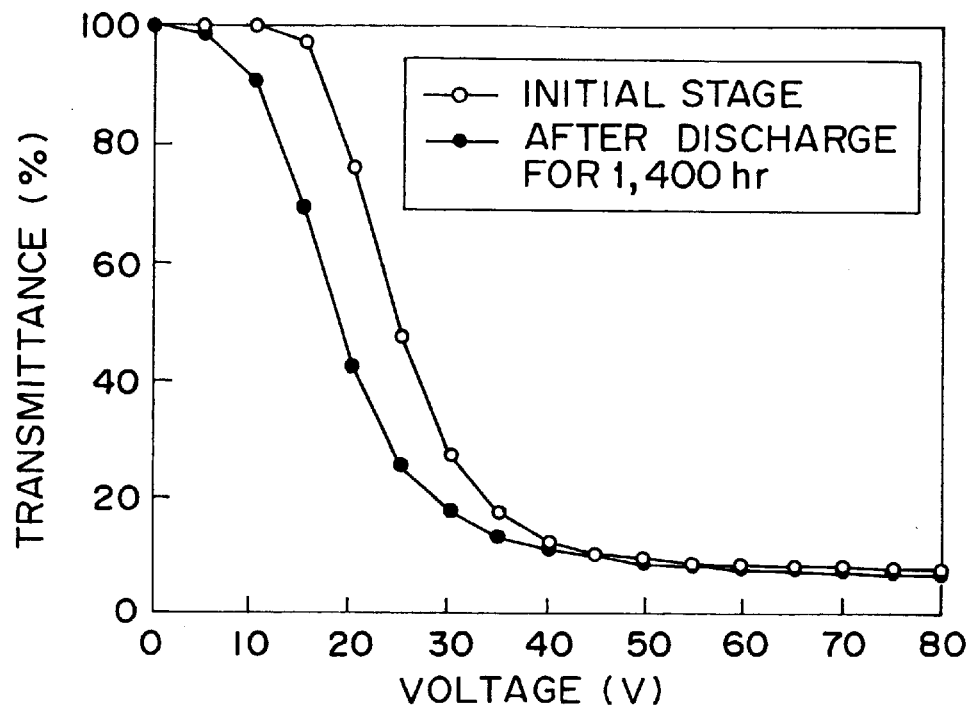
FIGS. 9A and 9B are graphs each showing a voltage/transmittance characteristic of a liquid crystal cell.

FIG. 9A is a graph showing a voltage/transmittance characteristic of the related art plasma addressed liquid crystal display. In this graph, the abscissa indicates a signal voltage applied to the signal electrodes 10 of the liquid crystal cell 1 and the ordinate indicates a transmittance of the liquid crystal cell 1. Data indicated by a mark (○) represents an initial value and data indicated by a mark (●) represents a characteristic after discharge for 1,400 hr. The graph shows that the pre-tilt angle of the liquid crystal 9 is changed due to irradiation of ultraviolet rays as described with reference to FIG. 6, and that the pre-tilt angle of the liquid crystal 9 becomes larger with an increase in irradiation time of ultraviolet rays. When the related art plasma addressed liquid crystal display is operated for a long-period of time, the pre-tilt angle of the liquid crystal 9 is enlarged and thereby the voltage/transmittance characteristic is shifted on the low voltage side as shown in FIG. 9A. consequently, the repeatability of the setting characteristic with an elapsed time cannot be attained.

Figure 9B:
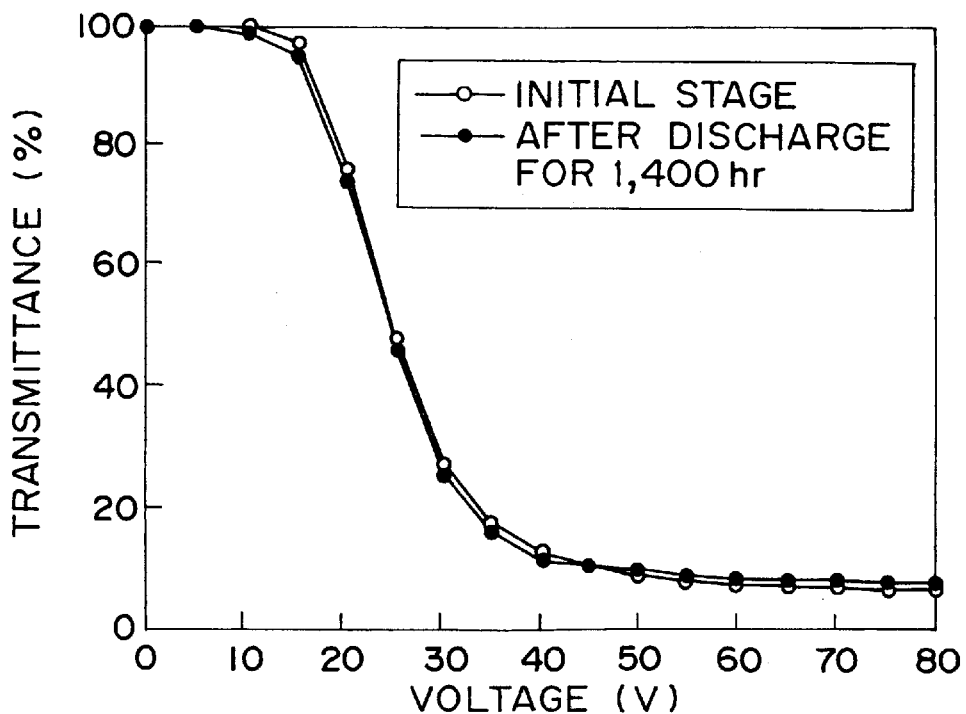

FIG. 9B is a graph showing a voltage/transmittance characteristic of the plasma addressed liquid crystal display including the ultraviolet rays transmission preventive film 6. In the plasma addressed liquid crystal display of the present invention, as shown in the graph, a large change in voltage/transmittance characteristic of the liquid crystal cell 1 is not recognized even after use for a long period of time. As a result, it becomes apparent that the ultraviolet ray transmission preventive film 6 exhibits a sufficient effect of stably keeping a long-period operation of the plasma addressed liquid crystal display.

While the preferred embodiments have been described using specific terms, such description is for illustrative purposes only, and it is to be understood that many changes and variations may be made without departing the scope or spirit of the following claims.

What is claimed is:

1. A plasma addressed liquid crystal display, comprising:
   a liquid crystal cell including columns of signal electrodes and a liquid crystal material and at least on alignment layer;
   a plasma discharg cell including rows of discharge channels, said plasma discharge cell underlying said liquid crystal cell, said plasma discharge cell being operable to generate a plasma discharge which results in ultraviolet radiation being emitted from the plasma discharge toward the liquid crystal cell; and
   an intermediate thin glass sheet through which said liquid crystal cell is joined to said plasma cell;
      wherein said thin glass sheet includes an ultraviolet ray transmission preventive layer having a function of absorbing or reflecting ultraviolet rays generated by the plasma discharge in said discharge channels on said plasma cell side immediately under said liquid crystal cell thereby substantially preventing the ultraviolet rays generated immediately under said liquid crystal cell from being made incident on said liquid crystal material and said at least one alignment layer of said liquid crystal cell side.

2. A plasma addressed liquid crystal display according to claim 1, wherein said ultraviolet ray transmission preventive layer comprises an ultraviolet ray transmission preventive film applied on at least one surface of said thin glass sheet.

3. A plasma addressed liquid crystal display according to claim 2, wherein said ultraviolet ray transmission preventive film contains at least $TiO_2$ or ZnO.

4. A method of manufacturing a plasma addressed liquid crystal display in which a liquid crystal cell including columns of signal electrodes is joined to a plasma cell including rows of discharge channels through an intermediate thin glass sheet, said method comprising the steps of:
   first forming an ultraviolet ray transmission preventive film having a function of absorbing or reflecting ultraviolet rays on one surface of the thin glass sheet by printing, spin-coating, vapor-deposition or sputtering;
   then joining a liquid plasma cell on one surface side of the thin glass sheet, said plasma discharge cell being operable to generate a plasma discharge that emits ultraviolet radiation; and
   joining a liquid crystal cell having a liquid crystal material on the other surface side of the thin glass sheet so that ultraviolet radiation from said plasma discharge is substantially prevented from reaching the liquid crystal material of the liquid crystal cell.

5. A method of manufacturing a plasma addressed liquid crystal display in which a liquid crystal cell including columns of signal electrodes is joined to a plasma cell including rows of discharge channels through an intermediate thin glass sheet, said method comprising the steps of:
   first applying an ultraviolet ray transmission preventive film having a function of absorbing or reflecting ultraviolet rays on both surfaces of the thin glass sheet by dipping, and baking the ultraviolet ray transmission preventive film;
   then joining a plasma discharge cell on one surface side of the thin glass sheet, said plasma discharge cell being operable to generate a plasma discharge that results in emission of ultraviolet radiation; and joining the liquid crystal cell having a liquid crystal material on the other surface side of the thin glass sheet so that ultraviolet radiation from said plasma discharge is substantially prevented from reaching the liquid crystal material of the liquid crystal cell.

* * * * *